United States Patent
Hwang et al.

(10) Patent No.: US 9,605,706 B2
(45) Date of Patent: Mar. 28, 2017

(54) RIVET NUT UNIT AND MOUNTING METHOD THEREOF

(71) Applicant: SUNGWOO HITECH CO., LTD., Busan (KR)

(72) Inventors: Seokhwan Hwang, Busan (KR); Mun Yong Lee, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 63 days.

(21) Appl. No.: 14/578,624

(22) Filed: Dec. 22, 2014

(65) Prior Publication Data
US 2015/0322992 A1 Nov. 12, 2015

(30) Foreign Application Priority Data

May 7, 2014 (KR) .................. 10-2014-0054345
Sep. 25, 2014 (KR) .................. 10-2014-0128439

(51) Int. Cl.
*F16B 37/04* (2006.01)
*F16B 37/06* (2006.01)
*F16B 33/00* (2006.01)

(52) U.S. Cl.
CPC .......... *F16B 37/062* (2013.01); *F16B 33/002* (2013.01); *Y10T 29/49945* (2015.01)

(58) Field of Classification Search
CPC .......... F16B 19/04; F16B 33/00; F16B 35/00; F16B 37/00; F16B 37/06; F16B 37/062; F16B 37/065; F16B 37/04; B23P 19/063
USPC ........ 411/182, 183, 171–172, 175, 501–502, 411/506
See application file for complete search history.

(56) References Cited

U.S. PATENT DOCUMENTS

| | | | | |
|---|---|---|---|---|
| 2,065,333 A | * | 12/1936 | Kirley | F16B 19/1027 411/339 |
| 2,649,884 A | * | 8/1953 | Westover | F16B 37/043 411/173 |
| 3,053,357 A | * | 9/1962 | Stanger | F16B 37/043 403/21 |
| 3,125,146 A | * | 3/1964 | Rosan | F16B 37/068 411/180 |
| 3,365,998 A | * | 1/1968 | Zahodiakin | F16B 19/10 411/183 |
| 3,638,259 A | * | 2/1972 | Eibes | F16B 19/1081 411/502 |

(Continued)

FOREIGN PATENT DOCUMENTS

CN 101016916 8/2007
CN 101460750 6/2009

(Continued)

*Primary Examiner* — Roberta Delisle
(74) *Attorney, Agent, or Firm* — Lex IP Meister, PLLC

(57) ABSTRACT

A rivet nut unit is disclosed. An exemplary embodiment of the present invention provides a rivet nut unit bonding at least one plate by being riveted to the plate and fastened with a bolt that may include: a head portion supported on an upper surface of the plate at a position corresponding to a processed hole in the plate, and formed with a penetration hole in the middle thereof corresponding to the hole; and an insertion portion extended from one side of the head portion, inserted into the hole, and formed with at least one slot and a protruding end bent to a lower surface of the plate for coupling the head portion to the plate while riveting the plate.

8 Claims, 19 Drawing Sheets

(56) References Cited

U.S. PATENT DOCUMENTS

| | | | | | |
|---|---|---|---|---|---|
| 4,085,651 | A | * | 4/1978 | Koscik | F16B 19/1081 411/41 |
| 4,263,833 | A | * | 4/1981 | Loudin | F16B 19/1081 411/41 |
| 4,391,559 | A | * | 7/1983 | Mizusawa | F16B 13/12 411/41 |
| 4,911,592 | A | * | 3/1990 | Muller | B23P 19/062 29/432.2 |
| 4,924,533 | A | * | 5/1990 | Stairs, Jr. | E03D 1/26 277/637 |
| 5,183,357 | A | * | 2/1993 | Palm | F16B 19/083 411/29 |
| 6,095,738 | A | * | 8/2000 | Selle | B21D 53/24 411/183 |
| 2002/0182028 | A1 | * | 12/2002 | Hinn-Shing | F16B 5/02 411/180 |
| 2006/0291974 | A1 | * | 12/2006 | McGee | B25B 27/0014 411/171 |
| 2007/0190859 | A1 | | 8/2007 | Christ | |
| 2011/0076114 | A1 | * | 3/2011 | Sano | F16B 19/1045 411/502 |

FOREIGN PATENT DOCUMENTS

| | | |
|---|---|---|
| EP | 1596154 | 11/2005 |
| JP | 2004-286088 | 10/2004 |
| JP | 2006-009926 | 1/2006 |
| KR | 10-1998-0070144 | 10/1998 |
| KR | 20-0250963 | 10/2001 |
| KR | 10-2005-0036183 | 4/2005 |
| KR | 10-2010-0033355 | 3/2010 |
| KR | 10-2013-0042350 | 4/2013 |
| KR | 10-2009-0027651 | 8/2014 |

* cited by examiner

RIVET NUT UNIT AND MOUNTING METHOD THEREOF

CROSS-REFERENCE TO RELATED APPLICATION

This application claims priority to and the benefit of Korean Patent Application No. 10-2014-0054345 filed in the Korean Intellectual Property Office on May 7, 2014, and Korean Patent Application No. 10-2014-0128439 filed on Sep. 25, 2014, the entire contents of which are incorporated herein by reference.

BACKGROUND OF THE INVENTION (a) Field of the Invention

The present invention relates to a rivet nut unit and a mounting method thereof. More particularly, the present invention relates to a rivet nut unit and a mounting method thereof that reduces a task process and improves a fastening force of plates by bonding one or more plates and simultaneously performing a role of a nut.

(b) Description of the Related Art

Generally, vehicle body panels made of different materials are assembled mechanically by using a weld nut and a bolt.

Such mechanical assembling requires a welding process that locates the weld nut at a hole of the panel and welds the weld nut by using a projection welding machine.

Moreover, the weld nut welded by the projection welding machine needs a panel made of a steel material because of supplying electricity.

Meanwhile, vehicle body panels use nonferrous metal materials such as an aluminum material according to a weight reduction trend of a vehicle. Thus, panels made of different materials such as aluminum and steel cannot be assembled by the weld nut and the projection welding machine.

Accordingly, a method of connecting a rivet or screwing is used to circumvent the drawback of the weld nut, however, a plurality of connecting portions of the rivet or screwing portion should be formed to maintain a fastening force.

A description of the related art is for comprehension of a background of the present invention and may include contents other than the conventional art that are already known to a person of common skill in the art.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a rivet nut unit and a mounting method thereof having advantages of reducing a task process and improving a fastening force of plates by bonding one or more plates and simultaneously performing a role of a nut.

An exemplary embodiment of the present invention provides a rivet nut unit bonding at least one plate by being riveted to the plate and fastened with a bolt that may include: a head portion supported on an upper surface of the plate at a position corresponding to a processed hole in the plate, and formed with a penetration hole in the middle thereof corresponding to the hole; and an insertion portion extended from one side of the head portion, inserted into the hole, and formed with at least one slot and a protruding end bent to a lower surface of the plate for coupling the head portion to the plate while riveting the plate.

The insertion portion may be formed with a hollow cylindrical shape corresponding to the penetration hole.

The slot may be formed to be long from one end of the insertion portion to the other end connected to the head portion, one slot may be disposed apart from another slot along a circumference of the insertion portion, and the two slots may form a predetermined angle therebetween.

The head portion may be integrally formed with at least one supporting portion protruding from one side thereof corresponding to an upper surface of the plate.

The supporting portion may include: a plurality of first support protrusions radially formed at an external circumferential surface of the insertion portion toward an external circumferential surface of the head portion; and a plurality of second support protrusions disposed between the first support protrusions along a circumferential direction of the head portion and formed to be rounded from the external circumferential surface of the head portion toward the external circumferential surface of the insertion portion.

The supporting portion may further include a third support protrusion which connects one side of the head portion and the external circumferential surface of the insertion portion corresponding to each of the second support protrusions by being formed with a triangular shape and inclined downward toward the external circumferential surface of the supporting portion from one side of the head portion.

The supporting portion may further include a third support protrusion which respectively connects the first support protrusions with each other by being formed with a circular ring shape and protruded from one side of the head portion between each of the second support protrusions and the insertion portion.

The supporting portion may further include: a third support protrusion which respectively connects the first support protrusions with each other by being formed with a circular ring shape and protruded from one side of the head portion between each of the second support protrusions and the insertion portion; and a fourth support protrusion which connects one side of the head portion and the external circumferential surface of the supporting portion corresponding to each of the second support protrusions by being formed with a triangular shape and inclined downward toward the external circumferential surface of the supporting portion from one side of the head portion.

The supporting portion may include: a plurality of first support protrusions formed to be inclined toward the external circumferential surface of the head portion from the external circumferential surface of the insertion portion in a spiral direction and connected to the external circumferential surface of the head portion; and a plurality of second support protrusions formed to be rounded from the external circumferential surface of the head portion toward the external circumferential surface of the insertion portion along a circumferential direction of the head portion and with one end connected to the external circumferential surface of the head portion and other end connected to each of the first support protrusions.

Another exemplary embodiment of the present invention provides a rivet nut unit bonding at least one plate by being riveted to the plate and fastened with a bolt, that may include: a head portion supported on an upper surface of the plate at a position corresponding to a processed hole in the plate, and formed with a thread on an interior circumference surface; and an insertion portion extended from a lower part of the head portion, inserted into the hole, and formed with a protruding end bent to a lower surface of the plate in a state that penetrates through the hole while riveting the plate.

The insertion portion may be formed with a hollow cylindrical shape, and the protruding end may be formed to be rounded.

The insertion portion may be formed with a hollow cylindrical shape, the protruding end may be formed to be rounded and formed with at least one cutout groove, and one cutout groove may be spaced apart from another cutout groove circumferentially while the two cutout grooves form a predetermined angle therebetween.

The head portion may be integrally formed with at least one supporting portion on one side thereof in contact with the plate along a circumferential direction.

The supporting portion may be formed on a lower surface of the head portion along a circumferential direction, and a cross-section of the supporting portion may be formed with a triangular shape.

The supporting portion may be formed on a lower surface of the head portion along a circumferential direction to connect the lower surface of the head portion with an exterior circumference surface of the insertion portion.

Another exemplary embodiment of the present invention provides a mounting method of a rivet nut unit that bonds at least one plate by being riveted to a processed hole and fastened with a bolt that may include: disposing a fixed die under the plate corresponding to the hole; inserting the rivet nut unit into the hole to be mounted on the fixed die; and pressing a head portion of the rivet nut unit by an upper die mounted on an upper surface of the plate to slide upwardly or downwardly such that an end of an insertion portion is bent outward from the center of the insertion portion.

The fixed die may be integrally formed with an insertion rod in the middle of an upper surface thereof corresponding to the hole inserted into the insertion portion and a guide groove rounded concavely toward the outside of the insertion rod.

The guide groove may guide the end of the insertion portion protruding downward from the hole to be bent toward the outside of the insertion rod when the upper die presses the head portion of the rivet nut unit.

The upper die may be integrally formed with a support protrusion in the middle of a lower surface thereof corresponding to the center of the head portion and a fixed end fixing the head portion at both ends of the lower surface thereof.

The insertion portion may be formed with a hollow cylindrical shape corresponding to the insertion rod, a protruding end of the insertion portion is formed to be rounded, and the head portion may be formed with a polygonal shape including a circular shape and has a predetermined thickness to be fixed.

As described above, according to an exemplary embodiment of the present invention, the rivet nut unit may reduce a task process and improve a fastening force of plates by bonding one or more plates and simultaneously performing a role of a nut.

In addition, a fastening torque of the rivet nut unit may be increased by being formed with various supporting portions on a lower surface of the head portion which contacts the plate.

Moreover, the insertion portion of the rivet nut unit may fix the plate with a predetermined strength, such that the rivet nut unit may be prevented from spinning while being bolted.

DETAILED DESCRIPTION OF THE EMBODIMENTS

Figure 1:
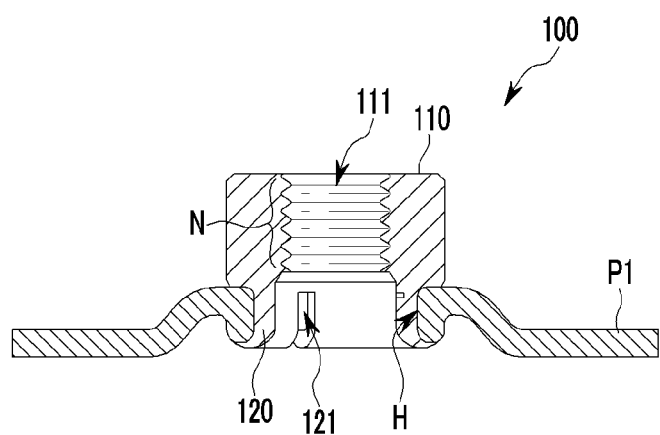
FIG. 1 is a cross-sectional view of a rivet nut unit applied to one plate according to an exemplary embodiment of the present invention.

An exemplary embodiment of the present invention will hereinafter be described in detail with reference to the accompanying drawings.

While the invention will be described in conjunction with an exemplary embodiment, it will be understood that present description is not intended to limit the invention to those exemplary embodiments. On the contrary, the invention is intended to cover not only the exemplary embodiment, but also various alternatives, modifications, equivalents and other embodiments, which may be included within the spirit and scope of the invention as defined by the appended claims.

Accordingly, the drawings and description are to be regarded as illustrative in nature and not restrictive. Like reference numerals designate like elements throughout the specification.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity.

In addition, unless explicitly described to the contrary, the word "comprise" and variations such as "comprises" or "comprising" will be understood to imply the inclusion of stated elements but not the exclusion of any other elements.

Figure 2:
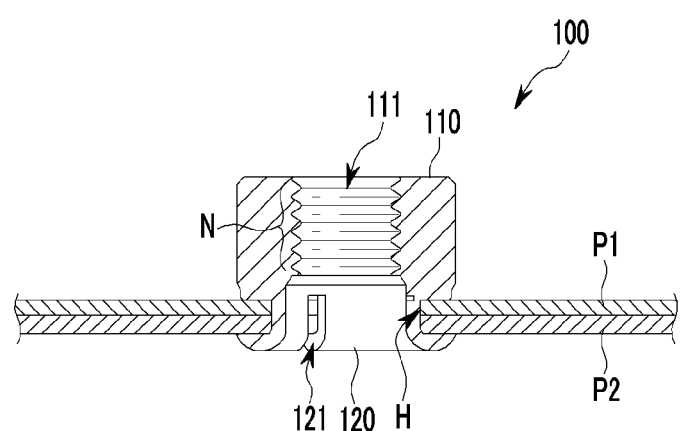
FIG. 2 is a cross-sectional view of a rivet nut unit applied to two plates according to an exemplary embodiment of the present invention.

FIG. 1 is a cross-sectional view of a rivet nut unit applying to one plate according to an exemplary embodiment of the present invention, and FIG. 2 is a cross-sectional view of a rivet nut unit applied to two plates according to an exemplary embodiment of the present invention.

Referring to the drawings, the rivet nut unit 100 according to an exemplary embodiment of the present invention may bond one or more plate P1 and P2 and simultaneously perform a role of a nut. Thus, a task process is reduced, workability and productivity are improved, and a fastening force of plates made of different materials is increased.

For these purpose, the rivet nut unit 100 according to an exemplary embodiment of the present invention is riveted to a processed hole H in plates P1 and P2 by coupling one plate P1 or bonding two plates P1 and P2 as shown in FIG. 1 and FIG. 2.

Herein, the plates P1 and P2 may include ferrous metal materials such as aluminum and steel, and non-ferrous materials such as plastics and rubber.

The plates P1 and P2 may be made of the same materials or different materials. Further, in the present exemplary embodiment, the plate P1 may be made of aluminum, and the plate P2 may be made of steel. The plates P1 and P2 may be exchanged in positions.

In the present exemplary embodiment, the plate P1 made of aluminum is disposed on an upper side, and the plate P2 made of steel is disposed on a lower side.

Hereinafter, the rivet nut unit 100 according to a first exemplary embodiment of the present invention will be described with reference to FIG. 3 and FIG. 4.

Figure 3:
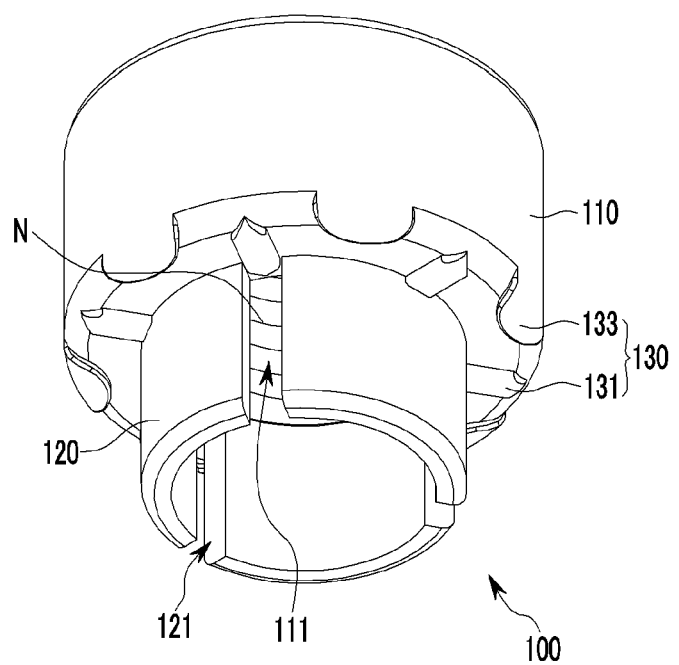
FIG. 3 is a perspective view of a rivet nut unit according to a first exemplary embodiment of the present invention.
Figure 4:
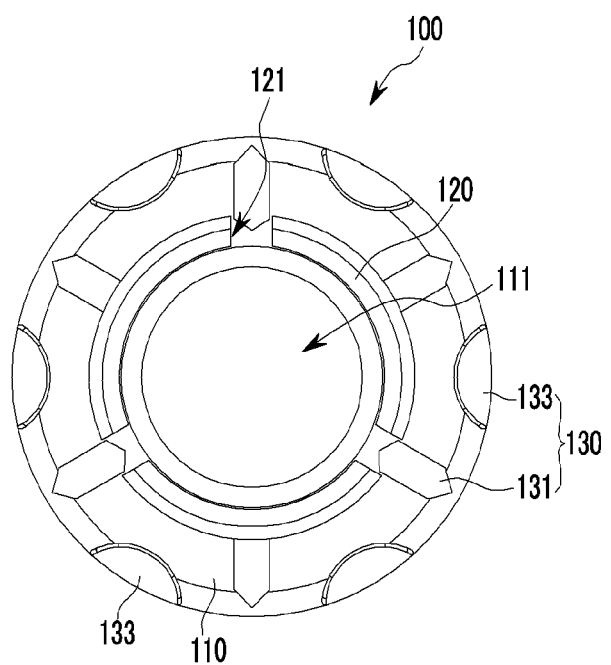
FIG. 4 is a rear view of a rivet nut unit according to the first exemplary embodiment of the present invention.

FIG. 3 is a perspective view of a rivet nut unit according to a first exemplary embodiment of the present invention, and FIG. 4 is a rear view of a rivet nut unit according to the first exemplary embodiment of the present invention.

As shown in FIG. 3, the rivet nut unit 100 according to the first exemplary embodiment of the present invention includes a head portion 110 and an insertion portion 120.

The head portion 110 is supported on an upper surface of the plate P1 disposed on an upper side among the plates P1 and P2 at a position corresponding to the processed hole H in the plates P1 and P2, and is formed with a penetration hole 111 in the middle thereof corresponding to the hole H.

The head portion 110 may have a predetermined thickness, and may be formed with a polygonal shape including a circular shape depending on a fastening tool. In the present exemplary embodiment, the head portion 110 is formed with a circular shape, and formed with a thread N at an interior circumference of the penetration hole 111.

The insertion portion 120 is extended from one side of the head portion 110 and inserted into the hole H. Also, the insertion portion 120 has at least one slot 121 and a protruding end which protrudes out of the hole H. The protruding end couples the head portion 110 to the plate P1 and P2 by being bent to a lower surface of the plates P1 or P2 while riveting the plate.

Herein, the insertion portion 120 is formed with a hollow cylindrical shape corresponding to the penetration hole 111.

The slot 121 is formed to be long from one end of the insertion portion 120 to other end connected to the head portion 110, one slot is disposed apart from another slot along a circumference of the insertion portion 120, and the two slots form a predetermined angle therebetween.

In the present exemplary embodiment, three slots 121 may be formed along the circumference of the insertion portion 120, and they may be spaced apart from each other at an angle of 120 degrees.

Accordingly, the insertion portion 120 may be smoothly bent outward at the angle of 120 degrees due to each slot 121 while riveting the plates P1 and P2.

Meanwhile, the plates P1 and P2 are plastically deformed and enter each slot 121 when the rivet nut unit 100 is riveted, so a coupling force between the plates P1 and P2 and the insertion portion 120 may be increased.

Herein, the head portion 110 may be integrally formed with at least one supporting portion 130 protruding from one side thereof corresponding to an upper surface of the plate P1.

In the first exemplary embodiment of the present invention, the supporting portion 130 includes a plurality of first support protrusions 131 and a plurality of second support protrusions 133 as shown in FIG. 4.

The first support protrusion 131 is radially formed at an external circumferential surface of the insertion portion 120 toward an external circumferential surface of the head portion 110.

Herein, six first support protrusions 131 may be formed on a lower surface of the head portion 110 toward the upper surface of the plate P1, and they are spaced apart from each other at an angle of 60 degrees along a circumferential direction of the head portion 110.

The second support protrusion 133 is formed along a circumferential direction of the head portion 110 and disposed between each of the first support protrusions 131.

Herein, six second support protrusions 133 may be formed to be rounded on the external circumferential surface of the head portion 130 toward the insertion portion 120, and they are spaced apart from each other at an angle of 60 degrees along a circumferential direction of the head portion 110.

That is, the first support protrusions 131 and the second support protrusions 133 are pressed by the plate P1 when the rivet nut unit 100 is riveted, so a fastening torque of the head portion 110 is increased. Accordingly, the rivet nut unit 100 may not spin in the hole H while being bolted to the penetration hole 111 of the head portion 110.

Hereinafter, a rivet nut unit 200 according to a second exemplary embodiment of the present invention will be described with reference to FIG. 5 and FIG. 6.

Figure 5:
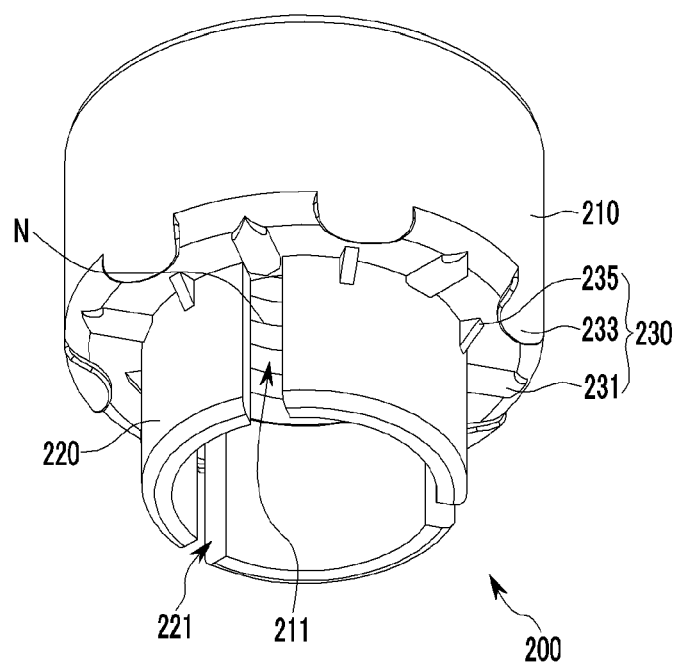
FIG. 5 is a perspective view of a rivet nut unit according to a second exemplary embodiment of the present invention.
Figure 6:
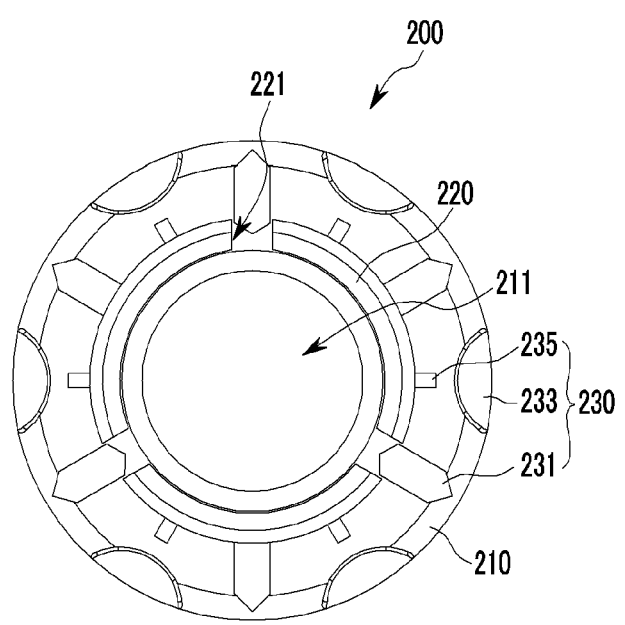
FIG. 6 is a rear view of a rivet nut unit according to the second exemplary embodiment of the present invention.

FIG. 5 is a perspective view of a rivet nut unit according to a second exemplary embodiment of the present invention, and FIG. 6 is a rear view of a rivet nut unit according to a second exemplary embodiment of the present invention.

Referring to the drawings, the rivet nut unit 200 according to the second exemplary embodiment of the present invention may bond one or more plates P1 and P2 and simultaneously perform a role of a nut. Thus, a task process is reduced, workability and productivity are improved, and a fastening force of plates made of different materials is increased. The rivet nut unit 200 includes a head portion 210 and an insertion portion 220.

The head portion 210 and the supporting portion 220 according to the second exemplary embodiment of the present invention are formed with the same configuration as those of the first exemplary embodiment, and hereinafter a detailed description of the configuration will be omitted.

A supporting portion 230 according to the second exemplary embodiment of the present invention includes a first support protrusion 231 and a second support protrusion 233, the same as the described first exemplary embodiment of the present invention. In addition, the supporting portion 230 further includes a plurality of third support protrusions 235 which connect one side of the head portion 210 and the external circumferential surface of the insertion portion 220 corresponding to each of the second support protrusions 233.

Herein, the third support protrusion 235 may be formed with a triangular shape and inclined downward toward the external circumferential surface of the supporting portion 220 from one side of the head portion 210.

Accordingly, the rivet nut unit 200 according to the second exemplary embodiment of the present invention may increase a fastening torque of the head portion 210 through the first support protrusion 231, the second support protrusion 233, and the third support protrusion 235.

Thus, the rivet nut unit 200 according to the second exemplary embodiment of the present invention may not spin in the hole H while being bolted to a penetration hole 211 of the head portion 210.

Hereinafter, the rivet nut unit 300 according to a third exemplary embodiment of the present invention will be described with reference to FIG. 7 and FIG. 8.

Figure 7:
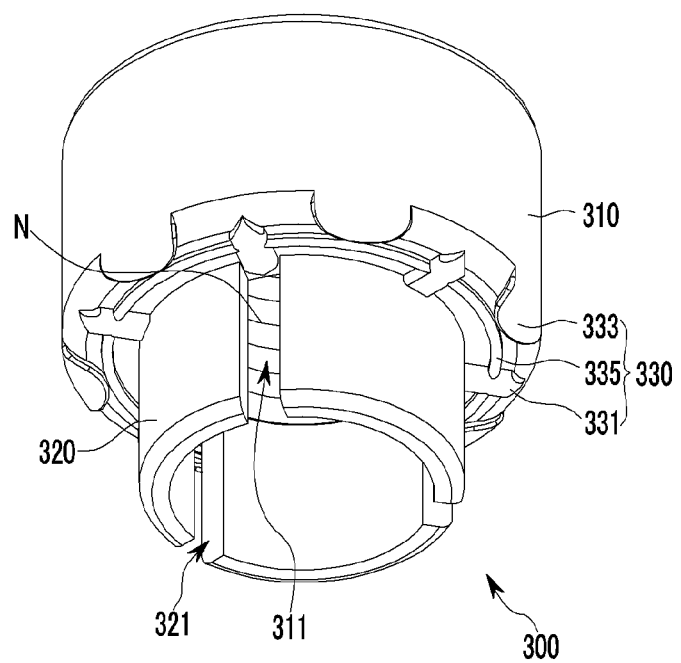
FIG. 7 is a perspective view of a rivet nut unit according to a third exemplary embodiment of the present invention.
Figure 8:
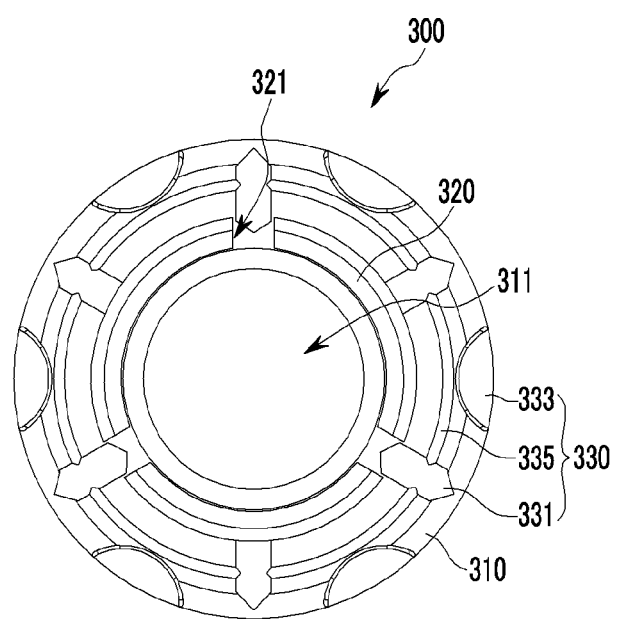
FIG. 8 is a rear view of a rivet nut unit according to the third exemplary embodiment of the present invention.

FIG. 7 is a perspective view of a rivet nut unit according to a third exemplary embodiment of the present invention, and FIG. 8 is a rear view of a rivet nut unit according to the third exemplary embodiment of the present invention.

Referring to FIG. 7 and FIG. 8, the rivet nut unit 300 according to a third exemplary embodiment of the present invention includes a head portion 310, an insertion portion 320 formed with a slot 321, and a supporting portion 330. The head portion 310 and the insertion portion 320 are formed with the same configuration as those of the first or second exemplary embodiment, and hereinafter, a detailed description of the configuration will be omitted.

The supporting portion 330 of the rivet nut unit 300 according to the third exemplary embodiment of the present invention which is formed on one side of the head portion 310 includes a first support protrusion 331, a second support protrusion 333, and a third support protrusion 335.

A plurality of first support protrusions 331 are formed radially at an external circumferential surface of the insertion portion 320 toward an external circumferential surface of the head portion 310.

In the present exemplary embodiment, six first support protrusions 331 may be formed on the head portion 310 along a circumferential direction, and they may be spaced apart from each other at an angle of 60 degrees.

A plurality of second support protrusions 333 are disposed between the first support protrusions 131 along a circumferential direction of the head portion 310.

The second support protrusion 333 is formed to be rounded from the external circumferential surface of the head portion 310 toward the external circumferential surface of the insertion portion 320. In the present exemplary embodiment, six second support protrusions 333 may be formed on the head portion 310 along a circumferential direction, and they may be spaced apart from each other at an angle of 60 degrees.

In addition, the third support protrusion 335 may respectively connect the first support protrusions 331 to each other between each of the second support protrusions 333 and the insertion portion 320.

The third support protrusion 335 may be formed with a circular ring shape and protruded from one side of the head portion 310.

The rivet nut unit 300 according to the third exemplary embodiment of the present invention may increase a fastening torque of the head portion 310 through the first support protrusion 331, the second support protrusion 333, and the third support protrusion 335.

Thus, the rivet nut unit 300 according to the third exemplary embodiment of the present invention may not spin in the hole H while being bolted to a penetration hole 311 of the head portion 310.

Hereinafter, the rivet nut unit 400 according to a fourth exemplary embodiment of the present invention will be described with reference to FIG. 9 and FIG. 10.

Figure 9:
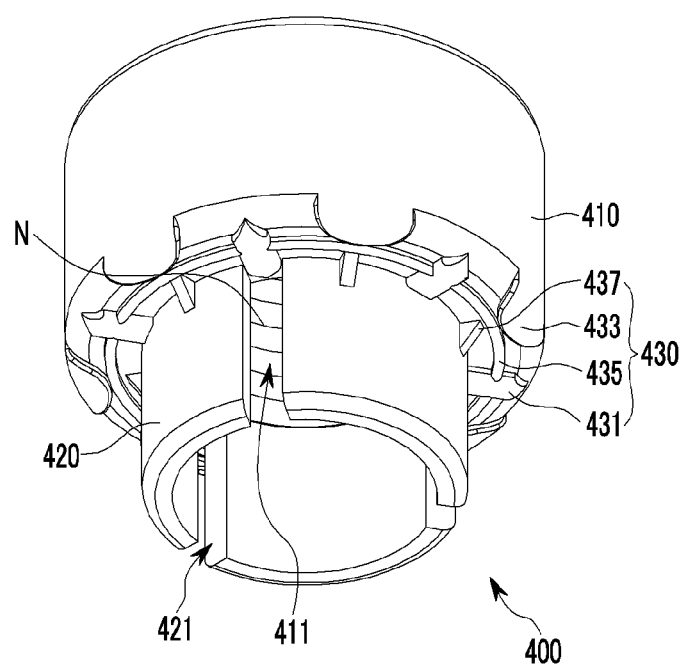
FIG. 9 is a perspective view of a rivet nut unit according to a fourth exemplary embodiment of the present invention.
Figure 10:
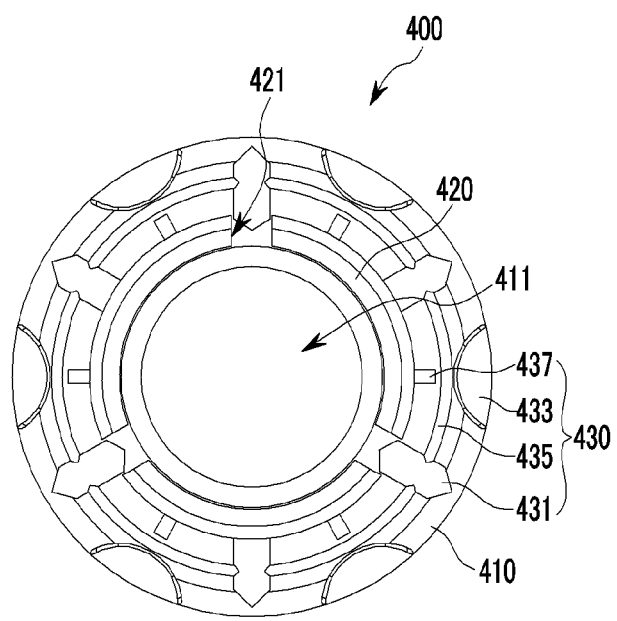
FIG. 10 is a rear view of a rivet nut unit according to the fourth exemplary embodiment of the present invention.

FIG. 9 is a perspective view of a rivet nut unit according to a fourth exemplary embodiment of the present invention, and FIG. 10 is a rear view of a rivet nut unit according to the fourth exemplary embodiment of the present invention.

Referring to FIG. 9 and FIG. 10, the rivet nut unit 400 according to a fourth exemplary embodiment of the present invention includes a head portion 410, an insertion portion 420 formed with a slot 421, and a supporting portion 430. The head portion 410 and the insertion portion 420 are formed with the same configuration as those of the first, second, or third exemplary embodiment, and hereinafter, a detailed description of the configuration will be omitted.

The supporting portion 430 of the rivet nut unit 400 according to a fourth exemplary embodiment of the present invention which is formed on one side of the head portion 410 includes a first support protrusion 431, a second support protrusion 433, a third support protrusion 435, and a fourth support protrusion 437.

A plurality of first support protrusions 431 are formed radially at an external circumferential surface of the insertion portion 420 toward an external circumferential surface of the head portion 410.

In the present exemplary embodiment, six first support protrusions 431 may be formed on the head portion 410 along a circumferential direction, and they may be spaced apart from each other at an angle of 60 degrees.

A plurality of second support protrusions 433 are disposed between the first support protrusions 431 along a circumferential direction of the head portion 410.

The second support protrusions 433 are formed to be rounded from the external circumferential surface of the head portion 410 toward the external circumferential surface of the insertion portion 420. In the present exemplary embodiment, six second support protrusions 433 may be formed on the head portion 410 along a circumferential direction, and they may be spaced apart from each other at an angle of 60 degrees.

In addition, the third support protrusions 435 may respectively connect the first support protrusions 431 to each other between each of the second support protrusions 433 and the insertion portion 420.

The third support protrusion 435 may be formed with a circular ring shape and protruded from one side of the head portion 410.

The fourth support protrusion 437 connects one side of the head portion 410 and the external circumferential surface of the supporting portion 420 corresponding to each of the second support protrusions 435.

The fourth support protrusion 437 may be formed with a triangular shape and inclined downward toward the external circumferential surface of the supporting portion 420 from one side of the head portion 410.

The rivet nut unit 400 according to the fourth exemplary embodiment of the present invention may increase a fastening torque of the head portion 410 through the first support protrusion 431, the second support protrusion 433, the third support protrusion 435, and the fourth support protrusion 437.

Thus, rivet nut unit 400 according to the fourth exemplary embodiment of the present invention may not spin in the hole H while being bolted to a penetration hole 411 of the head portion 410.

Hereinafter, the rivet nut unit 500 according to a fifth exemplary embodiment of the present invention will be described with reference to FIG. 11 and FIG. 12.

Figure 11:
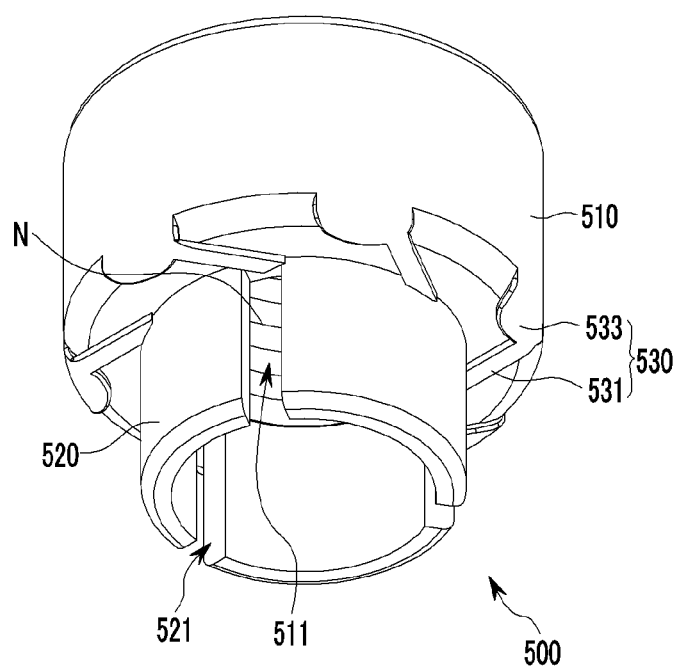
FIG. 11 is a perspective view of a rivet nut unit according to a fifth exemplary embodiment of the present invention.
Figure 12:
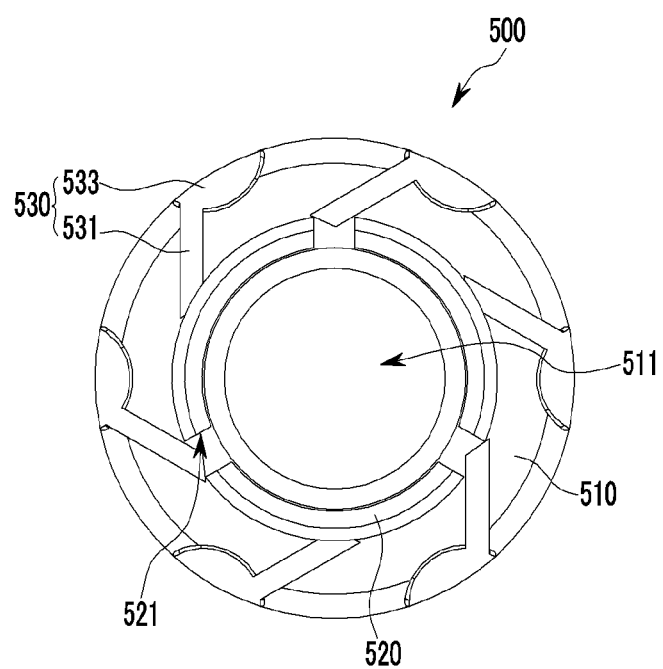
FIG. 12 is a rear view of a rivet nut unit according to the fifth exemplary embodiment of the present invention.

FIG. 11 is a perspective view of a rivet nut unit according to a fifth exemplary embodiment of the present invention, and FIG. 12 is a rear view of a rivet nut unit according to a fifth exemplary embodiment of the present invention.

Referring to FIG. 11 and FIG. 12, the rivet nut unit 500 according to a fifth exemplary embodiment of the present invention includes a head portion 510, an insertion portion 520 formed with a slot 521, and a supporting portion 530. The head portion 510 and the insertion portion 520 are formed with the same configuration as that of the first, second, third, or fourth exemplary embodiment, and hereinafter, a detailed description of configuration will be omitted.

The supporting portion 530 of the rivet nut unit according to a fifth exemplary embodiment of the present invention which is formed on one side of the head portion 510 includes a first support protrusion 531 and a second support protrusion 533.

A plurality of first support protrusions 531 are formed to be inclined toward the external circumferential surface of the head portion 510 from the external circumferential surface of the insertion portion 520 in a spiral direction.

In the present exemplary embodiment, six first support protrusions 531 may be formed on the head portion 510 along a circumferential direction, and they may be spaced apart from each other at an angle of 60 degrees.

A plurality of second support protrusions 533 are formed along a circumferential direction of the head portion 510. One end of the second support protrusion 533 is connected to the external circumferential surface of the head portion 510, and the other end of the second support protrusion 533 is connected to the first support protrusion 531.

Herein, the second support protrusion 533 is formed to be rounded from the external circumferential surface of the head portion 510 toward the external circumferential surface of the insertion portion 520. In the present exemplary embodiment, six second support protrusions 533 may be formed on the head portion 510 along a circumferential direction, and they may be spaced apart from each other at an angle of 60 degrees.

The rivet nut unit 500 according to the fifth exemplary embodiment of the present invention may increase a fastening torque of the head portion 510 through the first support protrusion 531 and the second support protrusion 533.

Thus, the rivet nut unit 500 according to the fifth exemplary embodiment of the present invention may not spin in the hole H while being bolted to a penetration hole 511 of the head portion 510.

The rivet nut units 100, 200, 300, 400, and 500 according to a first to fifth exemplary embodiments of the present invention insert the insertion portions 120, 220, 320, 420, and 520 of the rivet nut units 100, 200, 300, 400, and 500 into the processed hole H of the plate P1 or P2 when a fixed die is disposed under the hole H of the plate P1 or P2.

After that, a upper die mounted on a upper surface of the head portions 110, 210, 310, 410, and 510 to slide upwardly or downwardly presses the head portions 110, 210, 310, 410, and 510, and ends of the insertion portions 120, 220, 320, 420, and 520 are bent outward from the center of the insertion portions 120, 220, 320, 420, and 520 and fasten to the plate P1 or P2.

Herein, the fixed die may be formed with a guide groove to bend the insertion portions 120, 220, 320, 420, and 520.

By such a mechanism, the rivet nut units 100, 200, 300, 400, and 500 riveted to the plate P1 or P2 press the upper surface of the plate P1 or P2 in contact with the head portions 110, 210, 310, 410, and 510 through the supporting portions 130, 230, 330, 430, and 530. Therefore, the fastening torque and the fastening force of the rivet nut units 100, 200, 300, 400, and 500 may be increased by bending the insertion portions 120, 220, 320, 420, and 520.

As described above, the rivet nut units 100, 200, 300, 400, and 500 according to an exemplary embodiment of the present invention may reduce a task process and improve the fastening force of plates by bonding one or more plates P1 and P2 and simultaneously performing a role of a nut.

Figure 13:
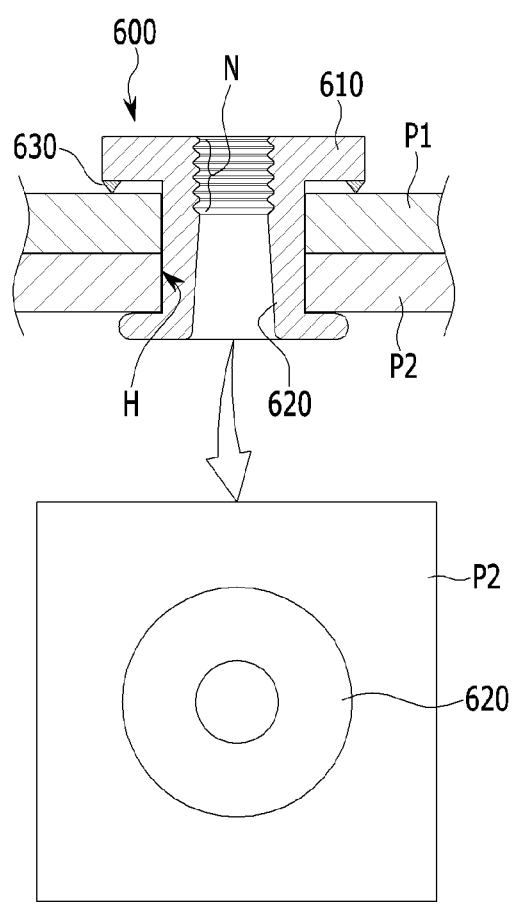
FIG. 13 is a use state diagram of a rivet nut unit according to a sixth exemplary embodiment of the present invention.
Figure 14:
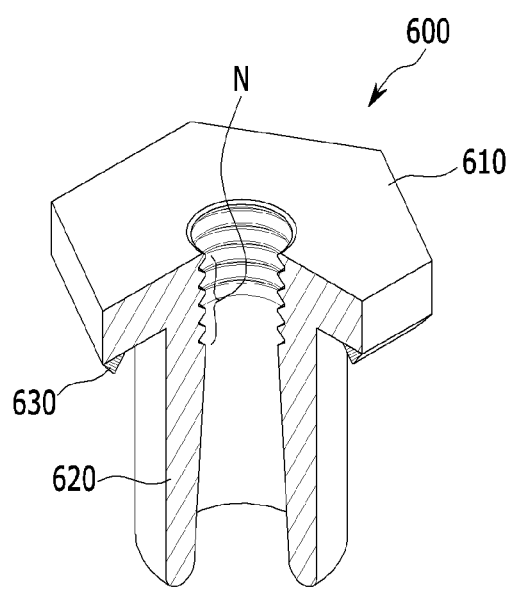
FIG. 14 is a projection perspective view of a rivet nut unit according to the sixth exemplary embodiment of the present invention.
Figure 15:
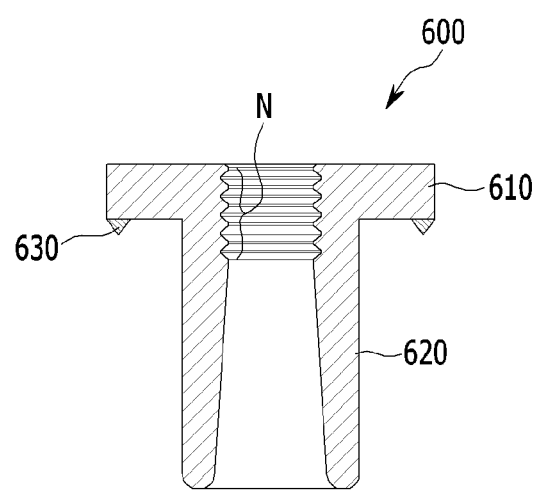
FIG. 15 is a cross-sectional view taken along lines A-A of FIG. 14.

FIG. 13 is a use state diagram of a rivet nut unit according to a sixth exemplary embodiment of the present invention, FIG. 14 is a projection perspective view of a rivet nut unit according to the sixth exemplary embodiment of the present invention, and FIG. 15 is a cross-sectional view taken along lines A-A of FIG. 14.

Referring to the drawings, a rivet nut unit 600 according to a sixth exemplary embodiment of the present invention reduces a task process and improves a fastening force of plates by bonding one or more plates P and simultaneously performing a role of a nut.

For these purpose, the rivet nut unit 600 according to a sixth exemplary embodiment of the present invention is riveted to the plates P1 and P2 to bond the plates P1 and P2 as shown in FIG. 13. In the present exemplary embodiment, the plates P1 and P2 made of different materials are disposed to be overlapped and processed with a hole H.

Herein, the plate P1 may be made of aluminum, the plate P2 may be made of steel, and the plates P1 and P2 may be exchanged in positions.

The rivet nut unit 600 according to a sixth exemplary embodiment of the present invention includes a head portion 610 an insertion portion 620 as shown in FIG. 14 and FIG. 15.

A lower surface of the head portion 610 is supported on an upper surface of the plate P1 dispose on an upper side among the plates P1 and P2 at a position corresponding to the processed hole H.

The head portion 610 may have a predetermined thickness, and may be formed with a polygonal shape including a circular shape depending on a fastening tool. In the present exemplary embodiment, the head portion 610 is formed with a hexagonal shape, and is formed with a thread N at an interior circumference thereof.

In addition, the head portion 610 may be integrally formed with at least one supporting portion 630 on a lower surface thereof corresponding to an upper surface of the plates P1 and P2.

The supporting portion 630 is formed on a lower surface of the head portion 610 along a circumferential direction, and a cross-section of the supporting portion 630 is formed with a triangular shape.

That is, the supporting portion 630 is pressed by the upper surface of the plate P1 and increases a fastening torque of the head portion 610 when the rivet nut unit 600 is riveted. Thus, the head portion 610 may not need to be fixed by using an extra fastening tool. Moreover, the rivet nut unit 600 may not spin in the hole H when the head portion 610 is connected.

The insertion portion 620 is extended from a lower part of the head portion 610, and inserted into the hole H. Also, the insertion portion 620 has a protruding end in a state that it penetrates through the hole while riveting the plates P1 and P2. The protruding end is bent to the outside of the lower surface of the plate P2 disposed at a lower part among the plates P1 and P2.

Herein, the insertion portion 620 is formed with a hollow cylindrical shape, and the protruding end inserted into the hole H is formed to be rounded.

Accordingly, the protruding end of the insertion portion 620 may be smoothly bent outward from the center of the insertion portion 620 in contact with a fixed die while being riveted.

Hereinafter, the rivet nut unit 700 according to a seventh exemplary embodiment of the present invention will be described with reference to FIG. 16 and FIG. 17.

Figure 16:
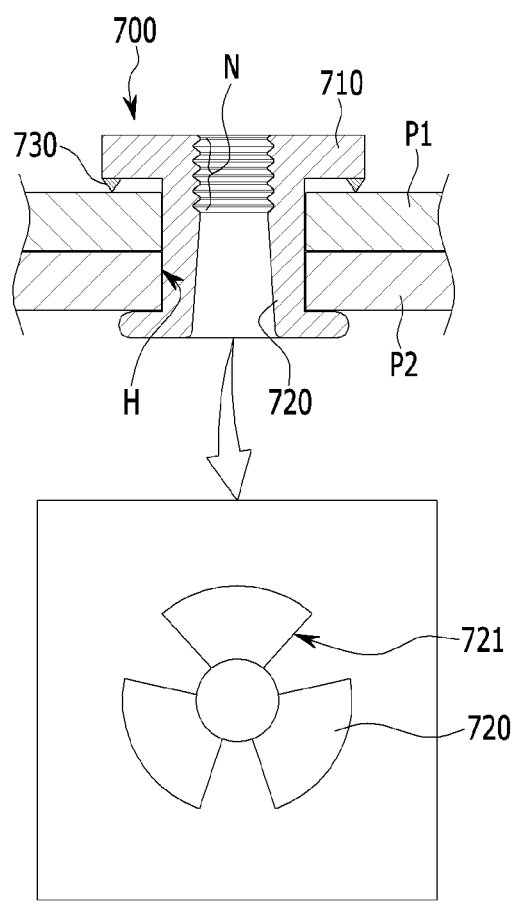
FIG. 16 is a use state diagram of a rivet nut unit according to a seventh exemplary embodiment of the present invention.
Figure 17:
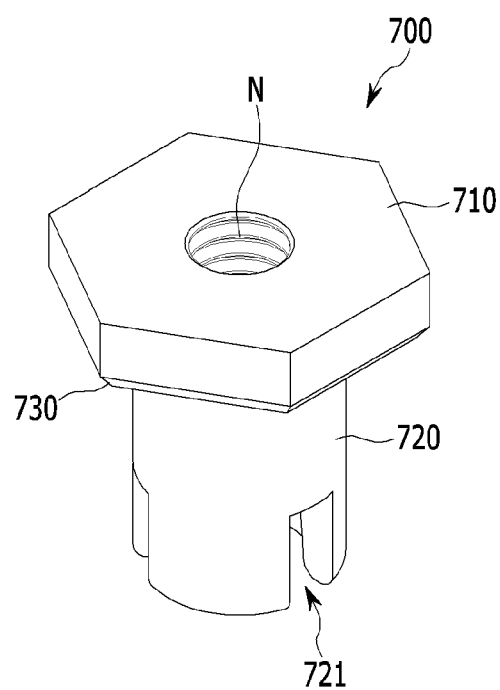
FIG. 17 is a projection perspective view of a rivet nut unit according to the seventh exemplary embodiment of the present invention.

FIG. 16 is a use state diagram of a rivet nut unit according to a seventh exemplary embodiment of the present invention, and FIG. 17 is a projection perspective view of a rivet nut unit according to the seventh exemplary embodiment of the present invention.

Referring to the drawings, the rivet nut unit 700 according to the seventh exemplary embodiment of the present invention may bond one or more plates P1 and P2 and simultaneously perform a role of a nut. Thus, a task process is reduced, workability and productivity are improved, and a fastening force of plates made of different materials is increased. The rivet nut unit 700 includes a head portion 710 and an insertion portion 720.

The head portion 710 is formed with the same configuration as the sixth exemplary embodiment, and hereinafter, a detailed description of configuration will be omitted.

As shown in FIG. 16 to FIG. 17, the insertion portion 720 of the rivet nut unit 700 according to a seventh exemplary embodiment of the present invention is formed with a hollow cylindrical shape, and the protruding end of the insertion portion 720 inserted into the hole H is formed to be rounded. In addition, the protruding end which protrudes from the hole H of the plates P1 and P2 is formed with at least one cutout groove 721.

The cutout groove 721 may be formed along the circumferential direction of the insertion portion 720, and one cutout groove may be spaced apart from another cutout groove circumferentially and the two cutout grooves may form a predetermined angle therebetween. The predetermined angle may be 120 degrees.

That is, the protruding end formed to be rounded may contact with a fixed die and be smoothly bent to the outside of the insertion portion 220 at an angle of 120 degrees based on the cutout groove 721 when the insertion portion 720 is riveted.

Hereinafter, the rivet nut unit 800 according to an eighth exemplary embodiment of the present invention will be described with reference to FIG. 18.

Figure 18:
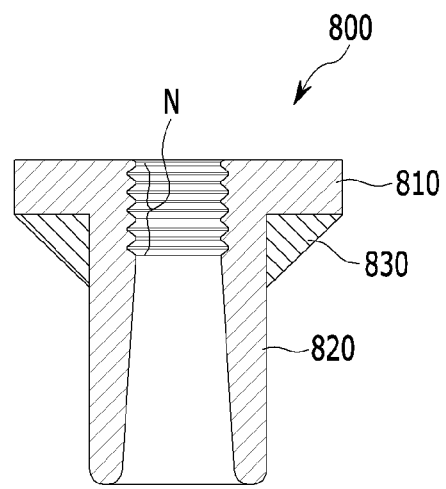
FIG. 18 is a cross-sectional view of a rivet nut unit according to an eighth exemplary embodiment of the present invention.

FIG. 18 is a cross-sectional view of a rivet nut unit according to an eighth exemplary embodiment of the present invention.

Referring to FIG. 18, the rivet nut unit 800 according to an eighth exemplary embodiment of the present invention includes a head portion 810 and an insertion portion 820. The head portion 810 and the insertion portion 820 of the rivet nut unit 800 according to the eighth exemplary embodiment of the present invention are formed with the same configuration as those of the sixth or seventh exemplary embodiment, and hereinafter, a detailed description of the configuration will be omitted.

A supporting portion 830 of the rivet nut unit 800 according to the eighth exemplary embodiment of the present invention is formed on a lower surface of the head portion 810 corresponding to an upper surface of the plates P1 and P2 along a circumferential direction. Therefore, the supporting portion 830 may connect the lower surface of the head portion 810 and an external circumferential surface of the insertion portion 820.

The supporting portion 830 presses the lower surface of the head portion 810 to the plate P1 between the hole H and the insertion portion 820 while being riveted such that a fastening torque is increased. Thus, the head portion 810 may not need to be fixed by using an extra fastening tool. Moreover, the rivet nut unit 800 may not spin in the hole H when the head portion 810 is connected.

Hereinafter, a mounting method of the rivet nut units 600, 700, and 800 according to the sixth to eighth exemplary embodiment of the present invention will be described with reference to FIG. 19.

Figure 19:
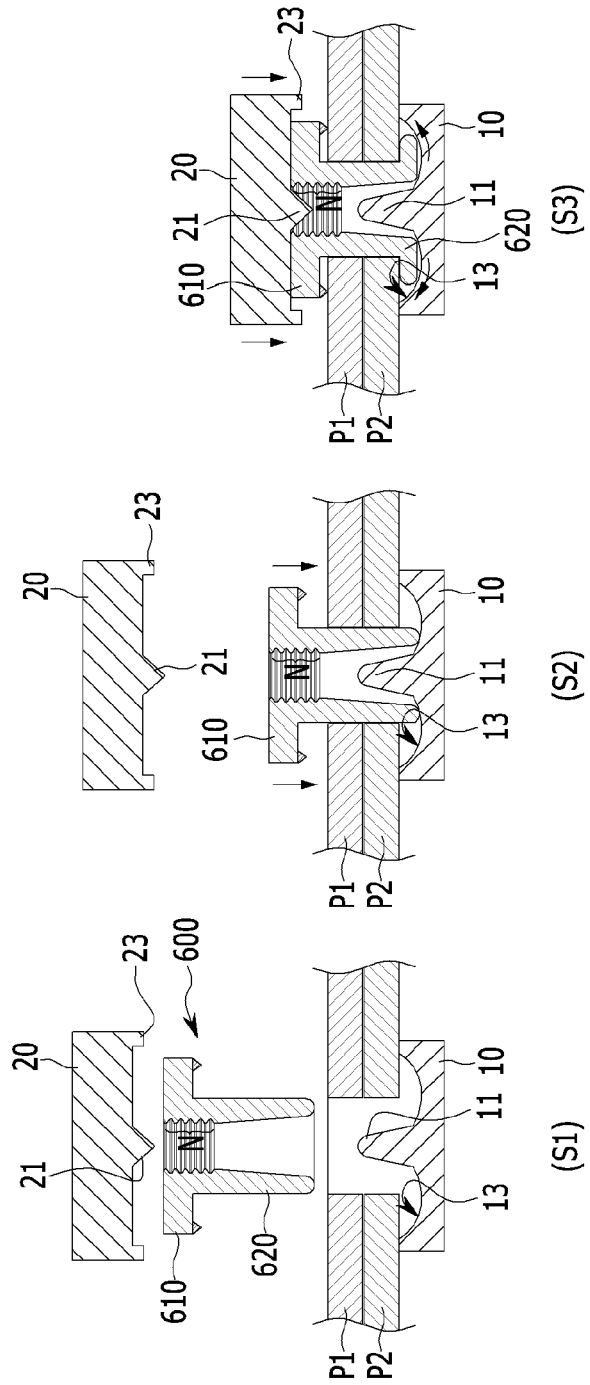
FIG. 19 is step-by-step installation state diagram describing a mounting method of a rivet nut unit according to an exemplary embodiment of the present invention.

FIG. 19 is step-by-step installation state diagram describing a mounting method of a rivet nut unit according to an exemplary embodiment of the present invention.

The mounting method of the rivet nut units 600, 700, and 800 according to the sixth to eighth exemplary embodiment of the present invention will be described with the same reference numerals of the sixth exemplary embodiment.

As shown in FIG. 19, a fixed die 10 is disposed under the plates P1 and P2 at a position corresponding to a processed hole H of the plates P1 and P2 at step S1.

After that, the rivet nut unit 600 is inserted into the hole H until an end of the insertion portion 620 reaches fixed die 10 at step S2.

After that, an upper die 20 mounted upon the plates P1 and P2 to slide upwardly or downwardly corresponding to the fixed die 10 presses the head portion 610 of the rivet nut unit 600 at step S3. Thus, the end of the insertion portion 620 is bent outward from the center of the insertion portion 620. Therefore, the riveting of the rivet nut unit 600 is completed, and it is mounted to the plates P1 and P2.

Herein, the fixed die 10 is integrally formed with an insertion rod 11 in the middle of the upper surface thereof corresponding to the hole H inserted with the insertion portion 620, and the upper surface of the fixed die 10 is integrally formed with a guide groove 13 rounded concavely toward the outside of the insertion rod 11.

The guide groove 13 guides the end of the insertion portion 620 protruding downward from the hole H to be bent toward the outside of the insertion rod 11 when the upper die 20 presses the head portion 610 of the rivet nut unit 600.

The end of the insertion portion 620 is formed to be rounded such that it can be smoothly bent toward the outside of the hole H in contact with the guide groove 13.

In the present exemplary embodiment, the upper die 20 is integrally formed with a support protrusion 21 in the middle of a lower surface thereof corresponding to the center of the head portion 610 which is formed with a thread at an interior circumference thereof. Also, the upper die 20 is integrally formed with a fixed end 23 fixing the head portion 610 at both ends of the lower surface thereof.

The head portion 610 has a predetermined thickness, and is formed with a polygonal shape including a circular shape. Thus, the upper die 20 may prevent the head portion 610 from spinning through the support protrusion 21 and the fixed end 23 when the upper die 20 descends to press the head portion 610.

Therefore, the upper die 20 presses the head portion 610 toward the fixed die 10 in a state that the head portion 610 is prevented from spinning, and completes riveting by bending the protruding end of the insertion portion 620 from the hole H of the plates P1 and P2.

As described above, the rivet nut units 600, 700, and 800 according to exemplary embodiments of the present invention may reduce a task process and improve the fastening force of plates by bonding one or more plates P1 and P2 and simultaneously performing a role of a nut.

In addition, a fastening torque of the rivet nut units 600, 700, and 800 may be increased by being integrally formed with the supporting portions 630, 730, and 830 on a lower surface of the head portions 610, 710, and 810.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rivet nut unit bonding at least one plate by being riveted to the plate and fastening with a bolt, the rivet nut unit comprising:
   a head portion supported on an upper surface of the plate at a position corresponding to a processed hole in the plate, and formed with a penetration hole in the middle thereof corresponding to the hole;
   an insertion portion extended from one side of the head portion, inserted into the hole, and formed with at least one slot and a protruding end bent to a lower surface of the plate for coupling the head portion to the plate while riveting the plate;
   wherein the head portion is integrally formed with at least one supporting portion protruding from one side thereof corresponding to an upper surface of the plate; and
   wherein the supporting portion comprises:
   a plurality of first support protrusions radially formed at an external circumferential surface of the insertion portion toward an external circumferential surface of the head portion; and
   a plurality of second support protrusions disposed between the first support protrusions along a circumferential direction of the head portion and formed to be rounded from the external circumferential surface of the head portion toward the external circumferential surface of the insertion portion.

2. The rivet nut unit of claim 1, wherein the insertion portion is formed with a hollow cylindrical shape corresponding to the penetration hole.

3. The rivet nut unit of claim 1, wherein the slot is formed to be long from one end of the insertion portion to the other end connected to the head portion, one slot is disposed apart from another slot along a circumference of the insertion portion, and the two slots form a predetermined angle therebetween.

4. The rivet nut unit of claim 1, wherein the supporting portion further comprises a third support protrusion which connects one side of the head portion and the external circumferential surface of the insertion portion corresponding to each of the second support protrusions by being formed with a triangular shape and inclined downward toward the external circumferential surface of the supporting portion from one side of the head portion.

5. The rivet nut unit of claim 1, wherein the supporting portion further comprises a third support protrusion which respectively connects the first support protrusions with each other by being formed with a circular ring shape and protruded from one side of the head portion between each of the second support protrusions and the insertion portion.

6. The rivet nut unit of claim 1, wherein the supporting portion further comprises:
   a third support protrusion which respectively connects the first support protrusions with each other by being formed with a circular ring shape and protruded from one side of the head portion between each of the second support protrusions and the insertion portion; and
   a fourth support protrusion which connects one side of the head portion and the external circumferential surface of the supporting portion corresponding to each of the second support protrusions by being formed with a triangular shape and inclined downward toward the external circumferential surface of the supporting portion from one side of the head portion.

7. The rivet nut unit of claim 1, wherein the supporting portion comprises:
   a plurality of first support protrusions formed to be inclined toward the external circumferential surface of the head portion from the external circumferential surface of the insertion portion in a spiral direction and connected to the external circumferential surface of the head portion; and
   a plurality of second support protrusions formed to be rounded from the external circumferential surface of the head portion toward the external circumferential surface of the insertion portion along a circumferential direction of the head portion and with one end connected to the external circumferential surface of the head portion and other end connected to each of the first support protrusions.

8. A rivet nut unit bonding at least one plate by being riveted to a plate and fastened with a bolt, the rivet nut unit comprising:
   a head portion supported on an upper surface of the plate at a position corresponding to a processed hole in the plate, and formed with a thread on an interior circumference surface; and
   an insertion portion extended from a lower part of the head portion, inserted into the hole, and formed with a protruding end bent to a lower surface of the plate in a state that penetrates through the hole while riveting the plate,
   wherein the insertion portion is formed with a hollow cylindrical shape, and a tip of the protruding end is formed to be rounded such that it can be smoothly bent so that whole of an upper surface of the bent protruding end contacts the lower surface of the plate, and the protruding end is formed with at least one cutout groove, and one cutout groove is spaced apart from another cutout groove circumferentially while the two cutout grooves form a predetermined angle therebetween, wherein the head portion is integrally formed with at least one supporting portion on one side thereof in contact with the plate along a circumferential direction, and wherein the supporting portion is formed on a lower surface of the head portion along a circumferential direction and at a distance from the insertion portion, and a cross-section of the supporting portion is formed with a triangular shape to increase a fastening torque of the head portion when the rivet nut is riveted and forcedly pressed without the cross-section being inserted into the plate.

* * * * *